(12) United States Patent
Xu et al.

(10) Patent No.: US 12,062,173 B2
(45) Date of Patent: Aug. 13, 2024

(54) METHOD FOR DIAGNOSING PLANT DISEASES AND PLANT DISEASE DIAGNOSIS SYSTEM

(71) Applicant: Hangzhou Ruisheng Software Co., Ltd., Zhejiang (CN)

(72) Inventors: Qingsong Xu, Zhejiang (CN); Qing Li, Zhejiang (CN)

(73) Assignee: Hangzhou Ruisheng Software Co., Ltd., Zhejiang (CN)

( * ) Notice: Subject to any disclaimer, the term of this patent is extended or adjusted under 35 U.S.C. 154(b) by 0 days.

(21) Appl. No.: 18/286,754

(22) PCT Filed: Apr. 2, 2022

(86) PCT No.: PCT/CN2022/085172
§ 371 (c)(1),
(2) Date: Oct. 12, 2023

(87) PCT Pub. No.: WO2022/218185
PCT Pub. Date: Oct. 20, 2022

(65) Prior Publication Data
US 2024/0193778 A1    Jun. 13, 2024

(30) Foreign Application Priority Data
Apr. 15, 2021   (CN) .......................... 202110403195.4

(51) Int. Cl.
*G06K 9/00*    (2022.01)
*G06T 7/00*    (2017.01)

(52) U.S. Cl.
CPC .. *G06T 7/0014* (2013.01); *G06T 2207/20084* (2013.01); *G06T 2207/30188* (2013.01)

(58) Field of Classification Search
CPC ......... G06T 7/0014; G06T 2207/20084; G06T 2207/30188
See application file for complete search history.

(56) References Cited

U.S. PATENT DOCUMENTS

2021/0364487 A1* 11/2021 Zhang ....................... G01J 5/00
2023/0071265 A1*  3/2023 Bereciartua-Perez .......................
                                                      G06T 7/0012

FOREIGN PATENT DOCUMENTS

CN          105787446          7/2016
CN          109147933          1/2019
(Continued)

OTHER PUBLICATIONS

Jie Chen et al."Flower Pest Control Original Color Ecology Atlas", China Agricultural Press, Jan. 2009, with partial English translation, pp. 1-19.

(Continued)

*Primary Examiner* — Xin Jia
(74) *Attorney, Agent, or Firm* — JCIPRNET

(57) ABSTRACT

The disclosure relates to a method for diagnosing plant diseases and a plant disease diagnosis system. The method includes the following steps: acquiring a plant image; determining identification information according to the plant image, wherein the identification information includes at least one of species information and disease information; and extracting diagnostic information from a content management system according to the determined identification information, and outputting the diagnostic information.

25 Claims, 6 Drawing Sheets

(56) References Cited

FOREIGN PATENT DOCUMENTS

| CN | 109446250 | | 3/2019 | |
|----|-----------|---|--------|---|
| CN | 110223383 | | 9/2019 | |
| CN | 111340070 | | 6/2020 | |
| CN | 111340070 A | * | 6/2020 | ............... A01G 7/06 |
| CN | 113096100 | | 7/2021 | |
| EP | 3739504 A1 | * | 11/2020 | ......... G06K 9/00657 |
| WO | WO-2016025848 A1 | * | 2/2016 | ........... A01B 79/005 |

OTHER PUBLICATIONS

"Office Action of China Counterpart Application", issued on Jun. 24, 2022, pp. 1-11.
"Office Action of China Counterpart Application", issued on Dec. 9, 2022, pp. 1-7.
"Office Action of China Counterpart Application", issued on Apr. 23, 2023, pp. 1-26.
"International Search Report (Form PCT/ISA/210) of PCT/CN2022/085172," mailed on Jun. 23, 2022, with English translation thereof, pp. 1-4.
"Written Opinion of the International Searching Authority (Form PCT/ISA/237) of PCT/CN2022/085172," mailed on Jun. 23, 2022, pp. 1-5.

\* cited by examiner

METHOD FOR DIAGNOSING PLANT DISEASES AND PLANT DISEASE DIAGNOSIS SYSTEM

CROSS-REFERENCE TO RELATED APPLICATION

This application is a 371 of international application of PCT application serial no. PCT/CN2022/085172, filed on Apr. 2, 2022, which claims the priority benefit of China application no. 202110403195.4, filed on Apr. 15, 2021. The entirety of each of the above mentioned patent applications is hereby incorporated by reference herein and made a part of this specification.

BACKGROUND

Technical Field

The present disclosure relates to the field of computer technology, in particular, to a method for diagnosing plant diseases and a system for diagnosing plant diseases.

Description of Related Art

In the growth process of plants, they often encounter diseases, insect pests and other problems. Currently, there are professional personnel dealing with these problems. However, if these conditions are not detected, the growth of plants is very likely to be dramatically and adversely affected.

SUMMARY

One of the purposes of the present disclosure is to provide a method for diagnosing plant diseases, and the method includes: acquiring a plant image; determining identification information according to the plant image, wherein the identification information includes at least one of species information and disease information; and extracting diagnostic information from a content management system according to the determined identification information, and outputting the diagnostic information.

In some embodiments, with regard to different plant images, if the determined identification information is all the same, at least part of the diagnostic information changes along with different plant images.

In some embodiments, the at least part of the diagnostic information includes a reference image, the reference image at least corresponds to the disease information, and the reference image is similar to the plant image.

In some embodiments, extracting the diagnostic information from the content management system according to the determined identification information, and outputting the diagnostic information includes: in the content management system, determining a corresponding candidate reference image library according to the disease information; in the candidate reference image library, determining one or more reference images to be extracted and the priority corresponding to each of the one or more reference images based on the similarity with the plant images and/or the consistency with the species information; and outputting the one or more reference images, so that the one or more reference images are arranged according to priority in a descending order.

In some embodiments, in the candidate reference image library, the step of determining one or more reference images to be extracted and the priority corresponding to each of the one or more reference images based on the similarity with the plant images and/or the consistency with the species information includes: using the preset number of candidate reference images in the candidate reference image library that have the highest similarity with the plant image as a first reference image set, and using all other candidate reference images in the candidate reference image library as the second reference image set; in the first reference image set, determining a first reference image matching the species information at a first species classification level, wherein the determined first reference image has a first priority; in the second reference image set, determining a second reference image matching the species information at the first species classification level, wherein the determined second reference image has a second priority, and the second priority is lower than the first priority; in the first reference image set, determining a third reference image matching the species information at a second species classification level higher than the first species classification level, wherein the determined third reference image has a third priority, and the third priority is lower than the second priority; and in the second reference image set, determining a fourth reference image that matches the species information at the second species classification level, wherein the determined fourth reference image has a fourth priority, and the fourth priority is lower than third priority.

In some embodiments, in the candidate reference image library, the step of determining one or more reference images to be extracted and the priority corresponding to each of the one or more reference images based on the similarity with the plant images and/or the consistency with the species information further includes: when a reference image matching the species information at a species classification level lower than or equal to the preset species classification level cannot be determined in the first reference image set and the second reference image set, determining the preset default image corresponding to the disease information as the reference image.

In some embodiments, the method further includes: cropping an edge region of an original image forming the reference image, so that the scale of the reference image obtained after cropping conforms to a preset display scale, and an image feature corresponding to the disease information in the reference image is in a middle region of the reference image.

In some embodiments, the step of extracting diagnostic information from the content management system according to the determined identification information, and outputting the diagnostic information includes: in the content management system, extracting corresponding diagnostic data according to a preset output field based on the determined identification information; when complete diagnostic data is extracted, generating the diagnostic information based on the diagnostic data and outputting the diagnostic information.

In some embodiments, the step of extracting diagnostic information from the content management system according to the determined identification information, and outputting the diagnostic information further includes: when complete diagnostic data is not extracted, in the content management system, searching for corresponding diagnostic literature based on the determined identification information; and generating the diagnostic information based on the diagnostic literature, and outputting the diagnostic information.

In some embodiments, the step of extracting diagnostic information from the content management system according to the determined identification information, and outputting the diagnostic information further includes: in the content management system, generating the diagnostic information according to a preset output format, and outputting the diagnostic information.

In some embodiments, the diagnostic data includes diagnostic summary data, and the diagnostic summary data includes at least one of a disease name corresponding to a disease name field in the preset output field and a diagnostic summary corresponding to a diagnostic summary field in the preset output field.

In some embodiments, the diagnostic data includes diagnostic detailed data, which includes at least one of a disease analysis corresponding to a disease analysis field in the preset output field, a solution corresponding to a solution field in the preset output field, and a precautionary measure corresponding to a precautionary measure field in the preset output field.

In some embodiments, the step of determining the identification information based on the plant image includes: when the current diagnostic mode is a passive diagnostic mode, determining a candidate species and a candidate disease corresponding to at least part of the candidate species based on the plant image; for a candidate species with a corresponding candidate disease, removing the candidate disease of the candidate species according to a first preset condition; and after performing the removal, if there is a disease remaining, the remaining disease is used as disease information, and the candidate species corresponding to the remaining disease is used as the species information.

In some embodiments, the step of determining a candidate species and a candidate disease corresponding to at least part of the candidate species based on the plant image includes: determining whether the candidate species is on a default species whitelist; when the candidate species is on the preset species whitelist, determining a candidate disease corresponding to the candidate species based on the plant image and the candidate species; when the candidate species is not on the preset species whitelist, not determining the candidate disease corresponding to the candidate species for the candidate species.

In some embodiments, the step of removing the candidate disease of the candidate species according to the first preset condition includes: when there are at least two candidate diseases corresponding to the same candidate species, removing the candidate disease of the candidate species according to the first preset condition based on the diagnostic confidence level of the candidate disease in a descending order until the remaining disease is filtered or all candidate diseases corresponding to the candidate species are removed.

In some embodiments, the step of removing the candidate disease of the candidate species according to the first preset condition includes: determining whether the candidate species is on the preset species whitelist; when the candidate species is not on the preset species whitelist, removing the candidate disease corresponding to the candidate species.

In some embodiments, the step of removing the candidate disease of the candidate species according to the first preset condition includes: comparing the diagnostic confidence level of the candidate disease with a first preset confidence level; when the diagnostic confidence level of the candidate disease is less than the first preset confidence level, removing the candidate disease.

In some embodiments, the step of removing the candidate disease of the candidate species according to the first preset condition includes: comparing a diagnostic accuracy of the candidate disease with a preset accuracy; when the diagnostic accuracy of the candidate disease is less than the preset accuracy, removing the candidate disease.

In some embodiments, the step of removing the candidate disease of the candidate species according to the first preset condition includes: determining whether the candidate species is on a first candidate species blacklist corresponding to the candidate disease; when the candidate species is on the first candidate species blacklist, removing the candidate disease.

In some embodiments, the step of determining the identification information based on the plant image further includes: when the current diagnostic mode is an active diagnostic mode, determining a candidate species and the candidate disease information corresponding to the candidate species based on the plant image, wherein the candidate disease information includes the candidate disease or the candidate disease is not detected; filtering the disease information from the candidate disease information according to a second preset condition.

In some embodiments, the step of filtering the disease information from the candidate disease information according to the second preset condition includes: comparing the species confidence level of the candidate species with a second preset confidence level, and comparing a diagnostic confidence level of the candidate disease information corresponding to the candidate species with a third preset confidence level; when the species confidence level of the candidate species is greater than or equal to the second preset confidence level, and the diagnostic confidence level of the candidate disease information is greater than or equal to the third preset confidence level, filtering the candidate species as a first pending species, and filtering the candidate disease information as first pending disease information.

In some embodiments, the step of filtering the disease information from the candidate disease information according to the second preset condition includes: determining whether the first pending species is on a second candidate species blacklist corresponding to the first pending disease information; when the first pending species is on the second candidate species blacklist, removing the first pending disease information.

In some embodiments, the number of the plant image is at least two, and candidate species and candidate disease information corresponding to the candidate species are determined based on each of the plant images; the step of filtering the disease information from the candidate disease information according to the second preset condition includes: for each of the plant images, filtering the first pending disease information corresponding to the plant image and having the maximum diagnostic confidence level as the second pending disease information of the plant image; filtering disease information from the second pending disease information of all plant images according to a third preset condition.

In some embodiments, the step of determining the identification information based on the plant image further includes: when the current diagnostic mode is an active diagnostic mode, respectively determining the candidate species corresponding to each of the plant images based on multiple plant images; for the respective plant images, filtering the candidate species with the maximum species confidence level as the second pending species corresponding to the plant image; among the second pending species corresponding to the respective plant images, filtering the second pending species in the maximum number as species information, or filtering the second pending species in the maximum number and having the maximum species confidence level as the species information; determining the disease information corresponding to the species information.

In some embodiments, the step of determining the identification information according to the plant image includes: using a pre-trained species identification model to determine the species information according to the plant image; wherein the species identification model is a neural network model.

In some embodiments, the step of determining the identification information according to the plant image includes: using a pre-trained species identification model to determine the species information according to the plant image; wherein the species identification model is a neural network model.

In another aspect of the present disclosure, a plant disease diagnosis system is provided. The plant disease diagnosis system includes a processor and a memory. Instructions are stored in the memory. When the instructions are executed by the processor, steps of a method for diagnosing plant diseases as described above are implemented.

In yet another aspect of the present disclosure, a computer-readable storage medium is provided. Instructions are stored in the computer-readable storage medium. When the instructions are executed, steps of the method for diagnosing plant diseases as described above are implemented.

In still another aspect of the present disclosure, a computer program product is provided, and the computer program product includes instructions. When the instructions are executed by the processor, the steps of the method for diagnosing plant diseases as described above are implemented.

Other features and advantages of the present disclosure will become more apparent in the following detailed description of exemplary embodiments of the present disclosure with reference to the accompanying drawings.

BRIEF DESCRIPTION OF THE DRAWINGS

The accompanying drawings, which are incorporated in and constitute a part of this specification, illustrate embodiments of the disclosure and, together with the description, serve to explain principles of the disclosure.

The present disclosure may be more clearly comprehended from the following detailed description with reference to the accompanying drawings, among which.

Figure 1:
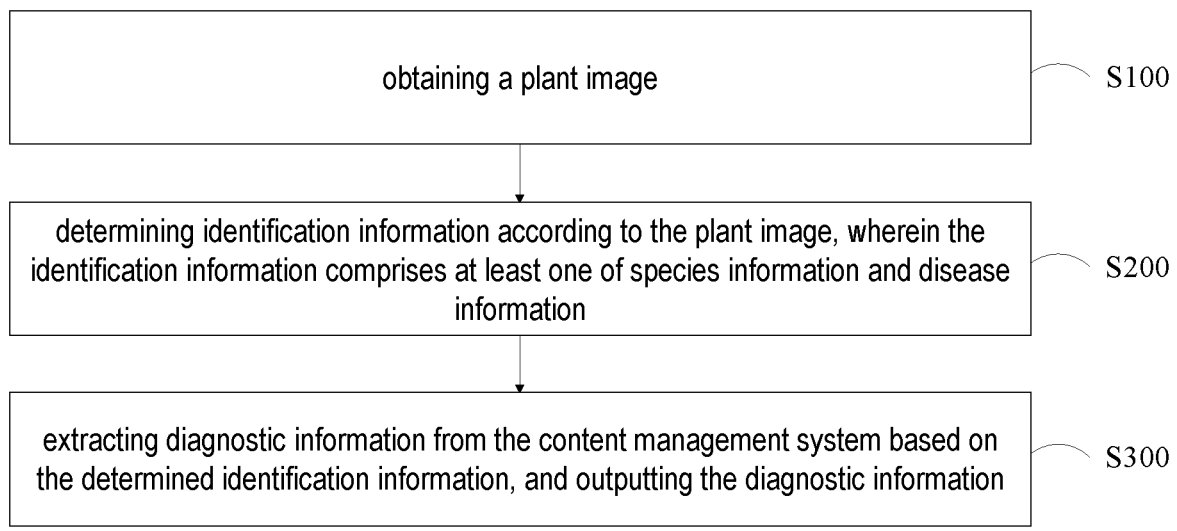
FIG. 1 shows a schematic flow diagram of a method for diagnosing plant diseases according to an exemplary embodiment of the present disclosure.

Note that in the embodiments described below, the same reference numerals are sometimes used in common between different drawings to denote the same parts or parts having the same functions, and repeated description thereof will be omitted. In some instances, similar reference numerals and letters are used to denote similar items, so that once an item is defined in one figure, it does not require further discussion in subsequent figures.

In order to facilitate understanding, the positions, dimensions, ranges, etc. of each structure shown in the drawings and the like may not represent the actual positions, dimensions, ranges, etc. Therefore, the present disclosure is not limited to the positions, dimensions, ranges, etc. disclosed in the drawings and the like.

DESCRIPTION OF THE EMBODIMENTS

Various exemplary embodiments of the present disclosure will be described in detail below with reference to the accompanying drawings. It should be noted that the relative arrangement of components and steps, numerical expressions, and numerical values set forth in these examples do not limit the scope of the disclosure unless otherwise specifically stated.

The following description of at least one exemplary embodiment is merely illustrative in nature and is in no way intended to limit the disclosure, its application or uses. That is, the structures and methods herein are shown in an exemplary manner to illustrate different embodiments of the structures and methods in the present disclosure. However, those skilled in the art will understand that they are merely illustrative of exemplary ways in which the disclosure may be practiced, and are not exhaustive. Furthermore, the drawings are not necessarily to scale and some features may be exaggerated to illustrate details of particular components.

Techniques, methods and devices known to those of ordinary skill in the relevant art may not be discussed in detail, but where appropriate, such techniques, methods and devices should be considered authorized part of the specification.

In all examples shown and discussed herein, any specific values should be construed as illustrative only, and not as limiting. Therefore, other examples of the exemplary embodiment may have different values.

FIG. 1 shows a schematic flowchart of a method for diagnosing plant diseases according to an exemplary embodiment of the present disclosure. The method may be implemented in an application (app) installed on a smart terminal such as a mobile phone or tablet computer. As shown in FIG. 1, the method may include: step S100, obtaining a plant image.

In some examples, plant images uploaded by users may be obtained directly. In other examples, after receiving a user instruction, corresponding prompt information may be generated and output to prompt the user to upload the plant image. Furthermore, the prompt information may also include specific requirements for plant images, such as prompting the user to upload an image of the entire plant, partial images such as images of stems, leaves and other parts of the plant, or partial images of parts with obvious lesions, etc. In this case, multiple plant images may also be pre-processed such as marking, such as marking the image of the whole plant, marking the partial image of the plant separately (including marking the part where the plant is shown in the plant image), etc., so as to better to identify species information and/or disease information.

Step S200 is determining identification information according to the plant image, wherein the identification information includes at least one of species information and disease information.

Specifically, the identification of the plant image may include identification of at least one of a species and a disease, wherein the diagnosis of the disease may be performed in, for example, a passive diagnostic mode or an active diagnostic mode. In the passive diagnostic mode, both species information and disease information may be determined based on the plant image when only certain preset conditions are met, and only species information may be determined based on the plant image when the above preset conditions are not met. In the active diagnostic mode, both species information and disease information may be determined based on the plant image. It should also be noted that the disease information described herein may also include relevant information indicating that the plant is not suffering from any disease.

Figure 2:
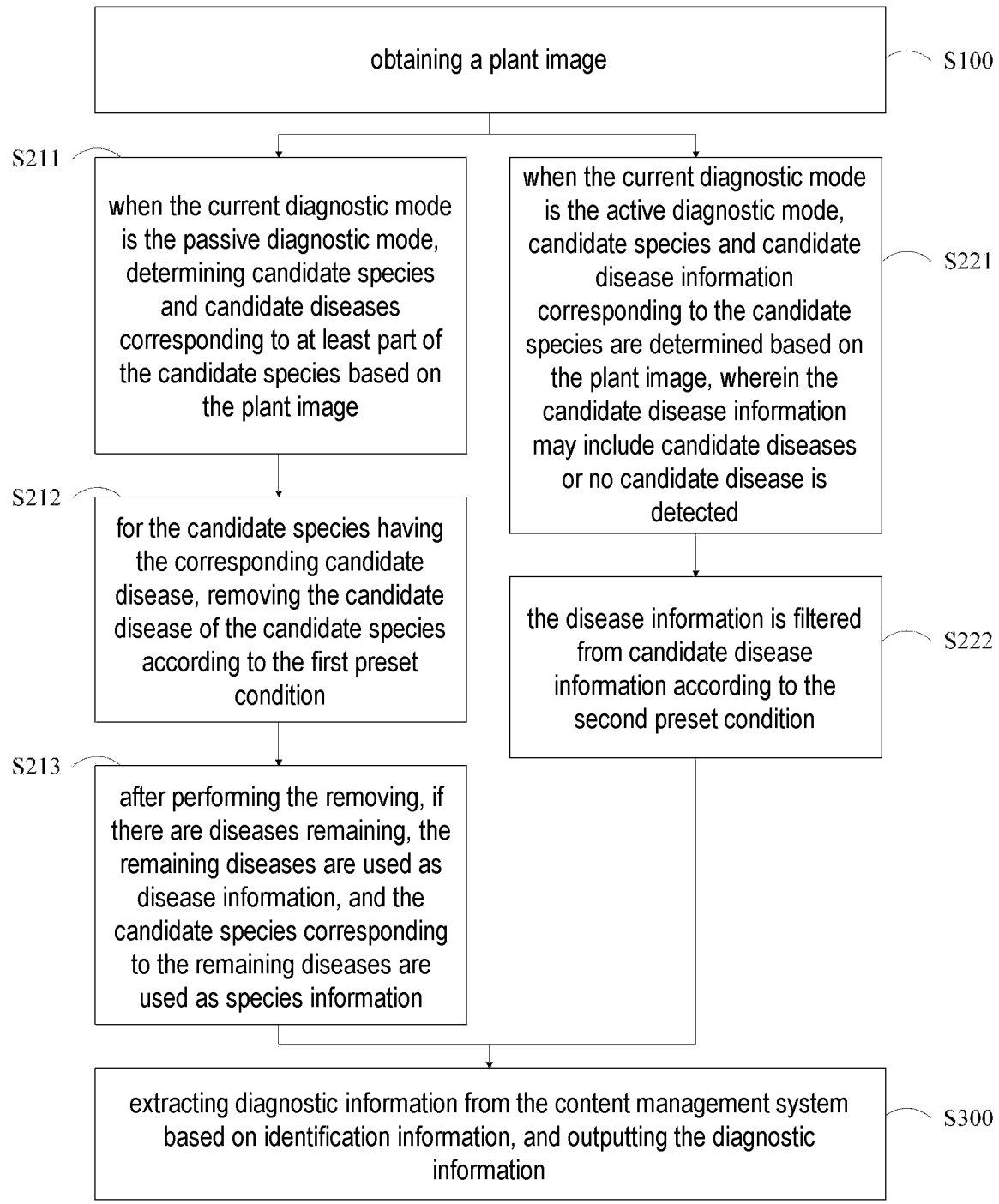
FIG. 2 shows a schematic flow diagram of a method for diagnosing plant diseases according to another exemplary embodiment of the present disclosure.
Figure 3:
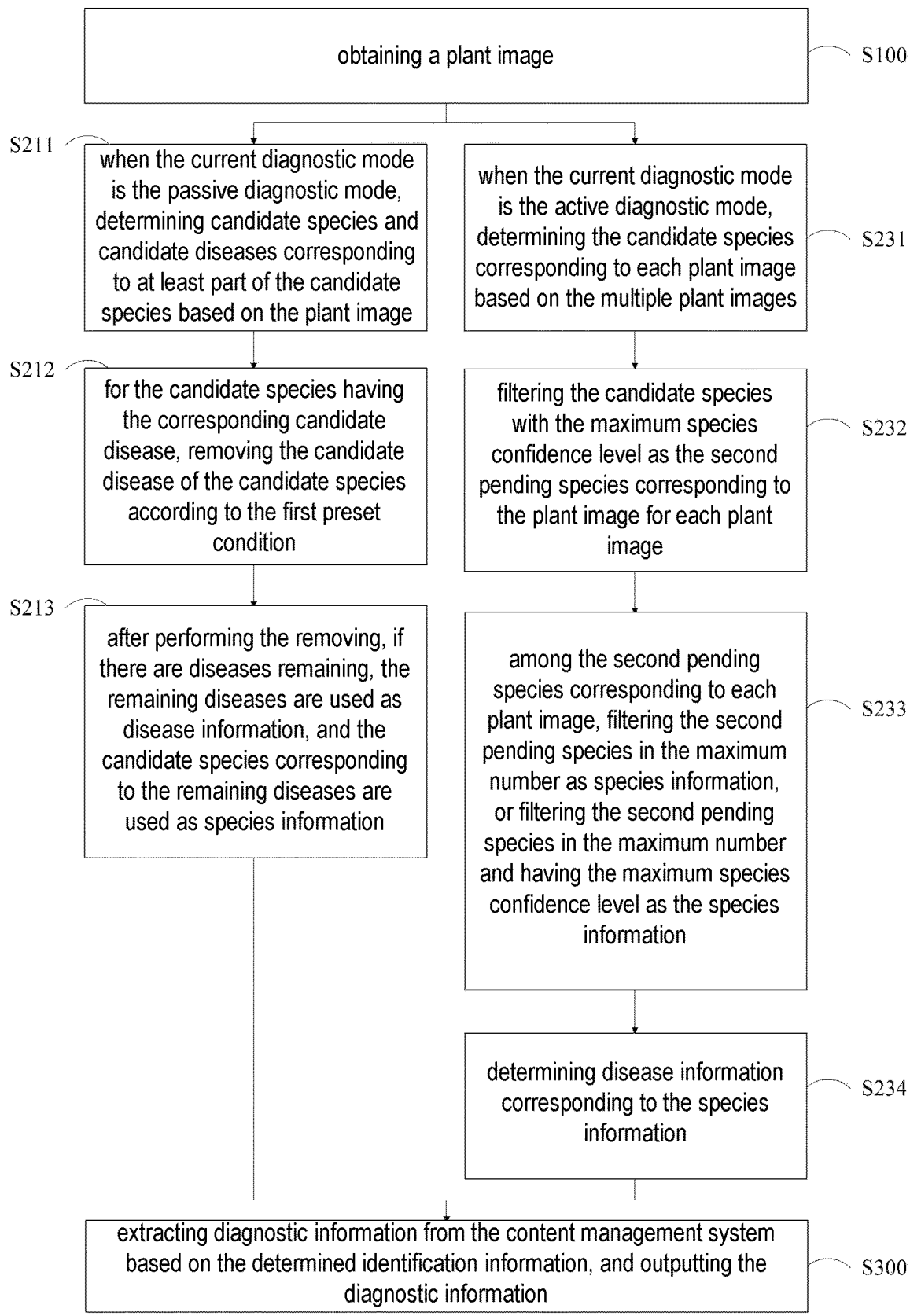
FIG. 3 shows a schematic flow diagram of a method for diagnosing plant diseases according to yet another exemplary embodiment of the present disclosure.

In some embodiments, as shown in FIG. 2 and FIG. 3, the step of determining the identification information according to the plant image may include:

Step S211: When the current diagnostic mode is the passive diagnostic mode, determining candidate species and candidate diseases corresponding to at least part of the candidate species based on the plant image.

When determining the candidate species and the candidate disease corresponding to the candidate species, the candidate species and the candidate disease corresponding to the plant image may be determined according to each of the plant images; the candidate species and candidate disease corresponding to the plant images may also be determined based on multiple related plant images.

A plant image might contain multiple candidate species, and each candidate species might suffer from multiple possible candidate diseases. In some embodiments, a corresponding candidate disease may be determined for each candidate species. In some other embodiments, corresponding candidate diseases may also be determined only for some candidate species, so as to simplify the processing.

For example, in some examples, disease diagnosis may be performed only on some candidate species with high confidence level to generate candidate diseases corresponding to these candidate species and wait for a further filtering operation, wherein the species confidence level refers to the probability that the species corresponding to the plant image is the candidate species.

Alternatively, in other examples, the step of determining the candidate species and the candidate diseases corresponding to at least part of the candidate species based on the plant image may include:

determining whether the candidate species is on a default species whitelist;

when the candidate species is on the preset species whitelist, determining a candidate disease corresponding to the candidate species based on the plant image and the candidate species; and when the candidate species is not on the preset species whitelist, not determining the candidate disease corresponding to the candidate species for the candidate species.

The species included in the preset species whitelist are generally common species or important species, and the diagnosis of diseases of these species generally is of relatively high accuracy and reliability. That is, diseases may be determined only for these species, thereby reducing difficulties of processing and avoiding outputting inaccurate, unreliable or unimportant diseases to users.

Candidate species or species information may be determined based on plant images using a pre-trained species identification model. The species identification model may be a neural network model, specifically a convolutional neural network model or a residual network model.

The convolutional neural network model is a deep feedforward neural network, which uses a convolution kernel to scan the plant image, extracts the features to be identified in the plant image, and then identifies the features to be identified on the plant. In addition, in the process of identifying plant images, the original plant images may be directly input into the convolutional neural network model without pre-processing the plant images. Compared with other identification models, the convolutional neural network model has higher identification accuracy and identification efficiency.

Compared with the convolutional neural network model, a residual network model has an additional identity mapping layer, which makes it possible avoid the accuracy saturation or even accuracy decline as the network depth (number of stacked layers in the network) increases. The identity mapping function of the identity mapping layer in the residual network model needs to satisfy the following condition: the sum of the identity mapping function and the input of the residual network model is equal to the output of the residual network model. After identity mapping is introduced, the change in the output of the residual network model is more obvious, so the identification accuracy and identification efficiency of plant species may be significantly improved.

In some embodiments, the step of training a species identification model may include:

obtaining a first sample set having a first preset number of species-marked plant images;

determining plant images of a first scale from the first sample set as a first training set;

training a species identification model by using the first training set; and when a first training accuracy rate is greater than or equal to a first preset accuracy rate, ending the training ends, and obtaining a trained species identification model.

Specifically, the first sample set may include a large number of plant images, and each of the plant images is correspondingly marked with a species. The plant image is input into the species identification model to generate the output species, and then relevant parameters in the species identification model may be adjusted according to comparison results between the output species and the marked species, that is, the species identification model is trained until the training ends when the first training accuracy rate of the species identification model is greater than or equal to the first preset accuracy rate, thereby obtaining the trained species identification model. According to a plant image, the species identification model may also output multiple candidate species, wherein each candidate species may have its corresponding species confidence level for further analysis and filtering.

Further, the trained species identification model may also be tested, and the testing operation may specifically include:

determining plant images of a second scale from the first sample set as a first test set;

determining an accuracy rate of the first model of the trained species identification model by using the first test set; and when the accuracy rate of the first model is less than the accuracy rate of a second preset accuracy rate, adjusting the first training set and/or the species identification model for retraining.

In general, the plant images in the first test set and the first training set are not exactly the same, so the first test set may be used to test whether the species identification model also has a good identification effect on other plant images not in the first training set. During the test, the accuracy rate of the first model of the species identification model is calculated by comparing the output species generated from the plant images in the first test set with the marked species. In some examples, the calculation method of the accuracy rate of the first model may be the same as the calculation method of the accuracy rate of the first training. When the accuracy rate of the first model obtained in the test is less than the second preset accuracy rate, it means that the identification effect of the species identification model is not good enough, so the first training set may be adjusted, for example, by increasing the number of species-marked plant images in the first training set, or adjusting the species identification model itself, or adjusting both of the two mentioned above, then the species identification model is retrained to improve its identification effect. In some embodiments, the second preset accuracy rate may be set equal to the first preset accuracy rate.

Likewise, it is possible to use the pre-trained disease diagnostic model to determine candidate diseases or disease information based on plant images. It should be noted that the disease information may include candidate diseases or no candidate disease detected. The disease diagnostic model may be a neural network model, specifically a convolutional neural network model or a residual network model.

In some embodiments, the step of training a disease diagnostic model may include:
  obtaining a second sample set having a second preset number of plant images marked with disease information;
  determining plant images of a third scale from the second sample set as a second training set;
  using the second training set to train a disease diagnostic model; and
  when the accuracy rate of the second training is greater than or equal to the third preset accuracy rate, ending the training ends, and obtaining a trained disease diagnostic model.

Specifically, the second sample set may include a large number of plant images, and each of the plant images is correspondingly marked with disease information. The disease information may be, for example, the disease of the plant in the plant image, or that no corresponding disease is detected on a healthy plant. The plant images in the second sample set may be at least partially the same as the plant images in the first sample set. The plant images are input into the disease diagnostic model to generate output disease information, and then relevant parameters in the disease diagnostic model may be adjusted according to comparison results between the output disease information and the marked disease information, that is, the disease diagnostic model is trained until the training ends when the accuracy rate of the second training of the disease diagnostic model is greater than or equal to the third preset accuracy rate, thereby obtaining the trained disease diagnostic model. According to a plant image, the disease diagnostic model may output multiple candidate disease information, wherein each candidate disease information may have its corresponding diagnostic confidence level, pending further analysis and filtering. The diagnostic confidence level refers to the probability that the disease information corresponding to the plant image is the candidate disease information.

Furthermore, the disease diagnostic model may also be tested, which may specifically include:
  determining plant images of a fourth scale from the second sample set as the second test set;
  determining the accuracy rate of the second model of the trained disease diagnostic model using the second test set; and
  when the accuracy rate of the second model is less than the fourth preset accuracy rate, adjusting the second training set and/or the disease diagnostic model for retraining.

In general, the plant images in the second test set and the second training set are not exactly the same, so the second test set may be used to test whether the disease diagnostic model also has a good diagnostic effect on other plant images not in the second training set. During the testing process, the accuracy rate of the second model of the disease diagnostic model is calculated by comparing the output disease information generated according to the plant images in the second test set and the marked disease information. In some examples, the calculation method of the accuracy rate of the second model may be the same as the calculation method of the accuracy rate of the second training. When the accuracy rate of the second model obtained by testing is less than the fourth preset accuracy rate, it means that the diagnostic effect of the disease diagnostic model is not good enough, so the second training set may be adjusted, for example, specifically by adding the number of plant images marked with disease information to the second training set, or adjusting the disease diagnostic model itself, or adjusting both of the above, and then the disease diagnostic model is retrained to improve its diagnostic effect. In some embodiments, the fourth preset accuracy rate may be set to be equal to the third preset accuracy rate.

Of course, in some embodiments, the identification and diagnosis of species and diseases may also be realized by the same pre-trained model, that is, the model may integrate the functions of the above-mentioned species identification model and disease diagnostic model.

Returning to FIG. 2 and FIG. 3, the step of determining at least one of the species information and the disease information according to the plant image may also include: step S212, for the candidate species having the corresponding candidate disease, removing the candidate disease of the candidate species according to the first preset condition.

Generally speaking, in the passive diagnostic mode, the main purpose of the user is not to diagnose the disease itself, but, for example, to determine the species information of the plant and the like. In this case, it is possible to only output diseases of high accuracy and reliability, so as to help users discover the disease of the plant in time and avoid causing additional confusion to users due to inaccurate output diseases. Specifically, diseases of low accuracy and reliability among the candidate diseases may be removed according to the first preset condition.

Specifically, when determining candidate species according to plant images, it might be determined that there are one or more candidate species. Under the circumstances, one or more candidate diseases may be determined for each candidate species, or, as mentioned above, it is possible to determine candidate diseases only for some candidate species. Further, for each candidate species that has a corresponding candidate disease, the candidate disease corresponding to the candidate species may be removed according to the first preset condition.

For example, in a specific example, based on a certain plant image or some plant images, the determined candidate species include species 1, species 2, and species 3. Species 1, species 2 and species 3 are arranged based on the species confidence level in a descending order. For example, the species confidence level for species 1 is 0.8, the species confidence level for species 2 is 0.75, and the species confidence level for species 3 is 0.7. In the passive diagnostic mode, the diseases that may be output are determined according to the first preset condition for each species. When removing candidate diseases is performed on a certain species, whether a certain candidate disease is to be removed may be determined according to the first preset condition one by one according to diagnostic confidence level of the candidate diseases of the species in a descending order. For example, there are three candidate diseases corresponding to species 2, and there are two candidate diseases corresponding to species 3. If the diagnostic confidence level for the disease 2-1 is 95%, the diagnostic confidence level for the disease 2-2 is 90%, and the diagnostic confidence level for the disease 2-3 is 82%, then in the process of performing removal on the species 2, it is possible to perform removal on the disease 2-1, the disease 2-2, and the disease 2-3 in sequence according to the diagnostic confidence level in a descending order. If no remaining diseases that can be used for output are found after removing the disease 2-1, removal is performed continuously on the disease 2-2. If remaining diseases that can be used for output have been found after removing the disease 2-1, then it is possible not to perform removal on the disease 2-2 continuously, so as to simplify the whole processing process. Of course, in some cases, it is also possible that no remaining disease that can be used for output is found after all of the candidate diseases are removed, then the removal is stopped, and no disease is output in the subsequent steps.

In the removal process, the first preset condition involved may be related to many factors, such as one or more of the diagnostic confidence level of this diagnosis, the type of candidate species, the diagnostic accuracy of a certain type of disease, and the consistency between the candidate species and the candidate disease, and the like.

In an embodiment, the step of removing the candidate diseases of candidate species according to the first preset condition may include:
  determining whether the candidate species is on a default species whitelist; and
  when the candidate species is on the preset species whitelist, removing the candidate disease corresponding to the candidate species.

Specifically, after determining candidate species and candidate diseases, removal may be performed first according to a preset species whitelist to reduce the amount of data to be processed during subsequent removal. The species included on the preset species whitelist are generally common species or important species, and the diagnosis of diseases of these species generally is of relatively high accuracy and reliability. In this embodiment, only diseases corresponding to these species may not be removed and be output in subsequent steps, so it is most likely to prevent inaccurate, unreliable or unimportant diseases from being output to the user and causing additional confusion to the user.

In an embodiment, the step of removing candidate diseases of candidate species according to the first preset condition may include:
  comparing the diagnostic confidence level of the candidate disease with a first preset confidence level; and
  when the diagnostic confidence level of the candidate disease is less than the first preset confidence level, removing the candidate disease.

The diagnostic confidence level may characterize the reliability of the obtained disease in a single diagnosis process. In a specific example, the first preset confidence level may be set to 70%. That is to say, when the diagnostic confidence level of a candidate disease is less than 70%, the candidate disease will be removed and will not be output, so as to avoid the output diagnostic information being inconsistent with the actual situation and causing trouble to the user.

In an embodiment, the step of removing candidate diseases of candidate species according to the first preset condition may include:
  comparing the diagnostic accuracy of candidate diseases with the preset accuracy; and
  when the diagnostic accuracy of the candidate disease is less than the preset accuracy, removing the candidate disease.

The diagnostic accuracy reflects the overall accuracy of identifying a specific type of disease. Diagnostic accuracy may be obtained based on the ratio of the number of correct diagnoses to the total number of times diagnoses among a certain total number of diagnoses. For some diseases that are difficult to diagnose, the diagnostic accuracy is often low. By removing out candidate diseases related to these diseases, it should be avoided to output inaccurate diseases as much as possible.

In an embodiment, removing candidate diseases of candidate species according to the first preset condition may include:
  determining whether the candidate species is on the first candidate species blacklist corresponding to the candidate disease; and
  when the candidate species is on the first candidate species blacklist, removing the candidate diseases.

Some certain species may not experience certain types of disease at all or the probability is low. Therefore, according to the mutually exclusive relationship between such species and diseases, corresponding candidate species blacklists may be set in advance to remove candidate diseases to improve the accuracy and reliability of the output.

It should be noted that the above specific methods on how to remove candidate diseases that meet the first preset condition may be combined with each other. For example, in a specific example, as long as the candidate disease satisfies any one of the conditions that the diagnostic confidence level is less than the first preset confidence level, the candidate species is not on the preset species whitelist, the diagnostic accuracy is less than the preset accuracy, and the candidate species is on the first candidate species blacklist corresponding to the candidate disease, the candidate disease will be filtered.

As shown in FIG. 2 and FIG. 3, determining identification information based on plant images may also include:

Step S213: After performing the removal, if there are diseases remaining, the remaining diseases are used as disease information, and the candidate species corresponding to the remaining diseases are used as species information.

After removing candidate diseases that meet the first preset condition, the following situations may follow:
  (1) After removing, there is only one disease remaining, then the remaining disease may be used as disease information, and the candidate species corresponding to the remaining disease may be used as species information for subsequent processing.

(2) After removing, there are at least two diseases remaining. Then, all remaining diseases may be included in the disease information, and the candidate species respectively corresponding to each remaining disease may be included in the species information for subsequent processing; or, one or several of the diseases are included in the diseases information according to the diagnostic confidence level of the remaining diseases in descending order or in other orders, and one or more candidate species corresponding to the remaining diseases included in the disease information are included in the species information for subsequent processing.

(3) After removing, if no remaining diseases are filtered, then, considering that the current identification mode is a passive identification mode, the disease information may be empty (or the plant is healthy). Correspondingly, in subsequent steps, it is possible that no disease is output, or the content "Health" may be filled in the symptom field to avoid causing additional trouble to users.

In an exemplary embodiment of the present disclosure, as shown in FIG. 2, the step of determining the identification information according to the plant image may further include:

Step S221: When the current diagnostic mode is the active diagnostic mode, candidate species and candidate disease information corresponding to the candidate species are determined based on the plant image.

Generally speaking, in active diagnostic mode, the user may have been aware of the problem of the plant and would like to diagnose it. Therefore, in active mode, candidate species and candidate disease information corresponding to each candidate species may be determined based on plant images to obtain the health status of the plant as comprehensively as possible for further analysis and processing by the user. The candidate disease information may include candidate diseases or no candidate disease is detected.

The candidate species may be determined through the species identification model described above, and the candidate disease information may be determined through the disease diagnostic model described above, which will not be described in details here.

Returning to FIG. 2, the step of determining identification information based on plant images may also include:

Step S222: The disease information is filtered from candidate disease information according to the second preset condition.

Compared with the passive diagnostic mode, in the active diagnostic mode, more candidate disease information may be included in the final disease information for user reference, and the requirements for the accuracy and reliability of the generated disease information may be properly reduced.

In the active diagnostic mode, there might be a large amount of data of the candidate species involved and the corresponding candidate disease information. In order to simplify the processing, the step of filtering the disease information from the candidate disease information according to the second preset condition may include:

comparing the species confidence level of the candidate species with the second preset confidence level, and comparing the diagnostic confidence level of the candidate disease information corresponding to the candidate species with the third preset confidence level; and when the species confidence level of the candidate species is greater than or equal to the second preset confidence level, and the diagnostic confidence level of the candidate disease information is greater than or equal to the third preset confidence level, filtering the candidate species as the first pending species, and filtering the candidate disease information as the first pending disease information.

That is to say, when filtering is performed according to the second preset condition, it is possible to only retain candidate species and corresponding candidate disease information whose species confidence level is greater than or equal to the second preset confidence level, and whose diagnostic confidence level is greater than or equal to the third preset confidence level to reduce the amount of data to be processed, thereby increasing the accuracy and reliability of the generated disease information.

Further, the step of filtering the disease information from the candidate disease information according to the second preset condition may also include:

determining whether the first pending species is on the second candidate species blacklist corresponding to the first pending disease information; and when the first pending species is on the second candidate species blacklist, removing the first pending disease information.

As noted above, some certain species may not experience certain types of disease at all or the probability is low. Therefore, according to the mutually exclusive relationship between such species and diseases, candidate species blacklists corresponding to the disease information may be set in advance to further remove first pending diseases information. On the one hand, it is possible to reduce the amount of data to be processed, so processing efficiency may be improved, and on the other hand, it possible to improve accuracy and reliability of output.

In some cases, there might be at least two plant images, and candidate species and candidate disease information corresponding to the candidate species are determined based on each plant image. Then, the step of filtering the disease information from the candidate disease information according to the second preset condition may include:

filtering the first pending disease information corresponding to the plant image and having the maximum diagnostic confidence level as the second pending disease information of the plant image respectively for each plant image; and filtering the disease information from the second pending disease information of all plant images according to the third preset condition.

That is, the second pending disease information corresponding to the plant image and having the maximum diagnostic confidence is filtered for each plant image. It should be noted that some of the disease information in the candidate disease information may have been removed according to one or more of the methods in the embodiments in the active identification mode described above. Therefore, the diagnostic confidence level of the second pending disease information is not necessarily the disease information having the maximum diagnostic confidence level among all the candidate disease information corresponding to the plant image. Then, the second pending disease information corresponding to each plant image is summarized, and the disease information is filtered therefrom. Disease information is generally disease information with the highest accuracy and reliability. Specifically, the disease information may be removed by referring to the method of filtering certain disease information based on the first preset condition described above. Alternatively, disease information may also be filtered based on other preset conditions.

The disease information may be the disease of the plant and its related information to help the user diagnose the disease and further take corresponding measures. Alternatively, the disease information may be that no disease has been detected, indicating that the plant is currently in a relatively healthy state.

In yet another exemplary embodiment of the present disclosure, when determining disease information, species information may be solely determined first based on plant images, and then the disease information may be determined based on the species information. Specifically, as shown in FIG. 3, the step of determining identification information based on plant images may also include:

step S231: when the current diagnostic mode is the active diagnostic mode, determining the candidate species corresponding to each plant image based on the multiple plant images;

step S232: filtering the candidate species with the maximum species confidence level as the second pending species corresponding to the plant image for each plant image;

step S233: among the second pending species corresponding to each plant image, filtering the second pending species in the maximum number as species information, or filtering the second pending species in the maximum number and having the maximum species confidence level as the species information.

For example, in one case for plant image A, plant image B, and plant image C respectively and according to species confidence level in a descending order, if the determined candidate species corresponding to plant image A include species M, species N and species P, the candidate species corresponding to plant image B include species N and species P, and the candidate species corresponding to plant image C include species N and species Q, then the filtered second pending species include species M corresponding to plant image A, species N corresponding to plant image B, and species N corresponding to plant image C. It may be seen that among the second pending species corresponding to various plant images, the number of species M is 1, and the number of species N is 2. In this case, species N will be used as species information.

In another case for plant image A, plant image B, and plant image C respectively and according to species confidence level in a descending order, if the determined candidate species corresponding to plant image A include species M, species N and species P, the candidate species corresponding to plant image B include species N and species P, and the candidate species corresponding to plant image C include species N and species Q, then the filtered second pending species include species M corresponding to plant image A, species N corresponding to plant image B, and species P corresponding to plant image C. It can be seen that in the second pending species corresponding to various plant images, the number of species M, species N, and species P are all 1. In this case, the species having the maximum species confidence level among species M, species N, and species P is used as species information. For example, if the species confidence level of species M is greater than the species confidence level of species N, and the species confidence level of species N is greater than the species confidence level of species P, then species M will be used as species information.

Returning to FIG. 3, the step of determining identification information based on plant images may also include:

step S234: determining disease information corresponding to the species information.

That is to say, on the premise that the resultant species is determined, the disease information corresponding to the resultant species is further determined. Specifically, after the species information is determined, the disease diagnostic model may be used to determine the candidate disease information based on the plant image according to the species information, and the candidate disease information is filtered according to the above-mentioned first preset condition, second preset condition or third preset condition, etc., thereby obtaining the disease information for output.

The disease information may be the disease of the plant and its related information to help the user diagnose the disease and further take corresponding measures. Alternatively, the disease information may be that no disease has been detected, indicating that the plant is currently in a relatively healthy state.

Returning to FIG. 1, methods for diagnosing plant diseases may also include:

step S300: extracting diagnostic information from the content management system based on at least one of the determined species information and disease information, and outputting the diagnostic information.

In the above operation, the content management system (CMS) may be a software system located between the WEB front-end and back-end systems or processes. Users may use a content management system to submit, modify, and publish content such as text files, pictures, data in databases, tables, etc. The content management system may also provide content retrieving tools to automatically retrieve content from third parties such as text files, HTML web pages, Web services, databases, etc., and put the data in the corresponding content library of the content management system itself after analysing and processing the data. The content management system may also assist the WEB front-end to provide content to users in a personalized way, that is, provide a personalized portal framework to better push content to users based on WEB technology. Descriptive content about plants and their diseases may be stored in the content management system in an embodiment of the present disclosure. These descriptive contents may include text or pictures, and may include various fields, articles, etc., for example. Accordingly, it is possible for users to obtain introductions about plants and their diseases, such as interesting stories, uses of plants, maintenance methods and descriptions of diseases, etc., from the diagnostic information extracted and output from the content management system.

Species name (UID1) may correspond to each species information in a one-to-one manner to distinguish different species. Similarly, disease name (UID2 or ComnonName) may correspond to each species information in a one-to-one manner to distinguish different diseases. When extracting relevant diagnostic information from the content management system, it is possible to make research based on UID1 and UID2. When a large amount of data is pre-stored in the content management system, most diagnostic situations may be involved to provide users with corresponding diagnostic information.

Based on the content management system, relevant information of multiple species may be output to users in the form of one species corresponding to one card. Users may switch between displaying various species and their related information by sliding cards on the interactive interface.

In some embodiments, for different plant images, if the determined identification information is the same, at least part of the diagnostic information may vary along with different plant images. In this way, even if the identification information obtained is the same, the output diagnostic information may be adaptively changed according to the plant image input by the user, thus achieving a more flexible output and helping to make the output diagnostic information to match the user's input, thereby improving user experience and reducing confusion caused to users by mismatched input and output.

Figure 4:
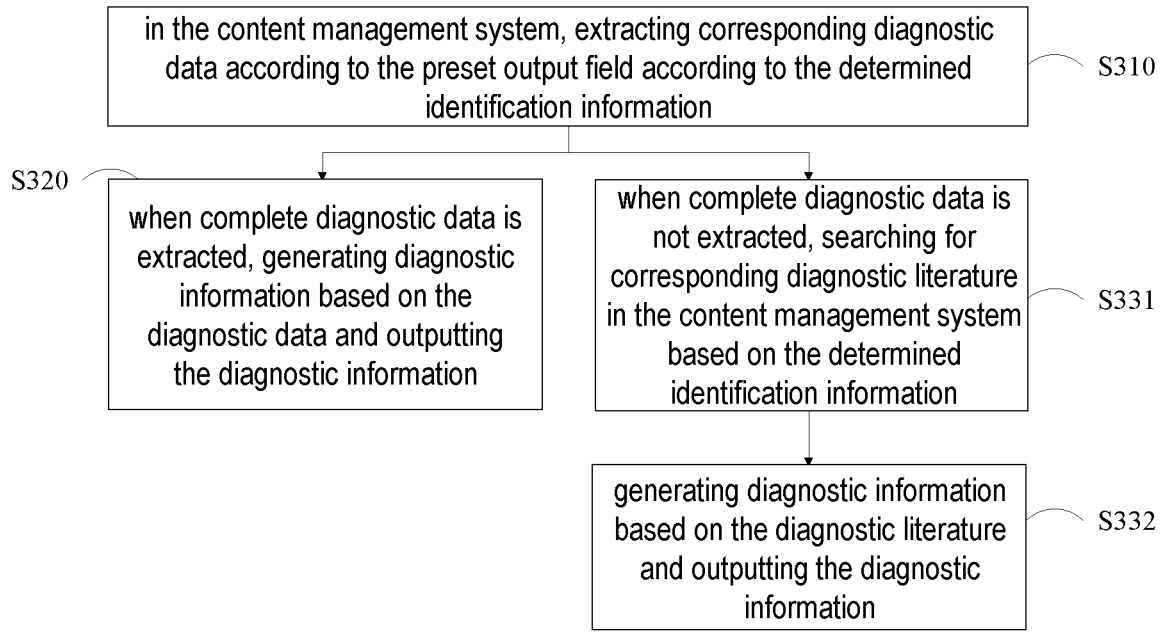
FIG. 4 shows a schematic flow diagram of step S300 according to a specific example of the present disclosure.

In some embodiments, as shown in FIG. 4, the step of extracting diagnostic information from the content management system based on the determined identification information, and outputting the diagnostic information may include:

- step S310: in the content management system, extracting corresponding diagnostic data according to the preset output field according to the determined identification information; and
- step S320: when complete diagnostic data is extracted, generating diagnostic information based on the diagnostic data and outputting the diagnostic information.

In some embodiments, the preset output fields may be set by the user through an interactive interface according to their own needs, or the preset output fields may also be several relatively fixed fields. In the content management system, corresponding diagnostic data extracted according to the determined identification information may be filled in a corresponding template with a preset output format to form diagnostic information. Diagnostic information may be organized or arranged in the form of cards, labels, etc., and output to the user. Users may select, switch or move cards, labels, etc. on the interactive interface to read the specific content contained in one or some cards and labels as needed to obtain relevant information.

In some embodiments, diagnostic data may include diagnostic summary data and/or diagnostic detail data. In diagnostic summary data and diagnostic detailed data, users may set different fields to store the data extracted from the content management system in the corresponding field.

Figure 5:
FIG. 5 shows a schematic diagram of a diagnostic card according to a specific example of the present disclosure.

In some embodiments, the diagnosis summary data may include at least one of a disease name corresponding to the symptom name field in the preset output field and a diagnosis summary corresponding to the diagnosis summary symptom in the preset output field. In some embodiments, the disease name and diagnosis summary may be displayed as a diagnosis card as shown in FIG. 5. Specifically, "Black Spot" is the name of the disease, and the recitation "Your plant get black spot on the leaves. It is due to xxx, xxx, xxxx, XXXX, XXXXX, XXXXX, XXX, XXX, XXXX, XXXX, xxxxx, xxxxx" is diagnostic summary. In addition, other buttons (such as "Check for causes") may be included in the diagnostic card shown in FIG. 5 to associate with other more detailed diagnostic information.

In some embodiments, the diagnostic detailed data may include at least one of diseases analysis corresponding to the symptom analysis field in the preset output field, solutions corresponding to the solution field in the preset output field, and preventive measures corresponding to preventive measure field in the preset output field. By storing disease analysis, solutions, and preventive measures in different fields, diagnostic information may be easily generated based on the content management system, so that users can easily check them.

Figure 6:
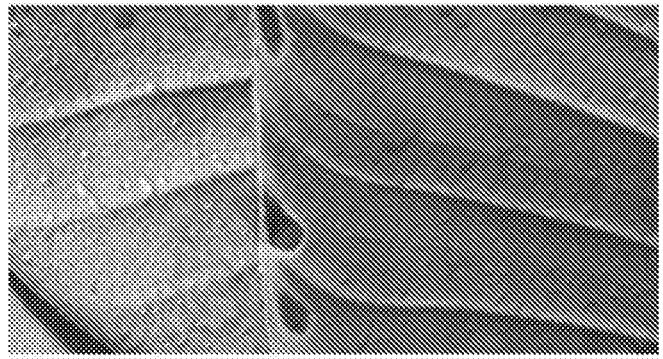
FIG. 6 shows a schematic diagram of displayed diagnostic information according to a specific example of the present disclosure.
Figure 6:
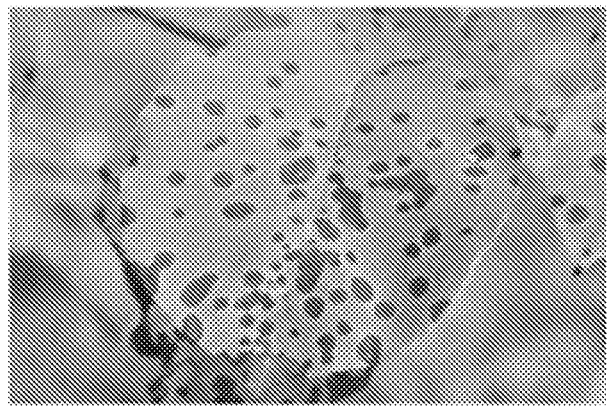

As shown in FIG. 6, FIG. 6 is a schematic diagram of displayed diagnostic information in a specific example. In the figure, the plant image from the user is displayed at the top of the interface, a diagnostic card including diagnostic summary data may be located below the plant image, and further diagnostic detailed data may be located below the diagnostic card.

In some embodiments, the complete diagnostic data may not be extracted from the content management system. In this case, the identification information determined based on the plant image may be output in a conventional way of displaying fixed content, or the diagnostic information may be obtained from relevant literature according to the determined identification information.

For example, as shown in FIG. 4, the step of extracting diagnostic information from the content management system based on the determined identification information, and outputting the diagnostic information may also include:

- step S331: when complete diagnostic data is not extracted, searching for corresponding diagnostic literature in the content management system based on the determined identification information;
- step S332: generating diagnostic information based on the diagnostic literature and outputting the diagnostic information.

As shown in FIG. 6, a reference image (the image located below FIG. 6) may be included in at least part of the diagnostic information that may be adaptively changed along with the plant image. The reference image at least corresponds to the disease information, and the reference image is similar to the plant image. In this way, the output diagnostic information may no longer be fixed. Instead, relevant pictures for explanation in the output diagnostic information may be replaced based on the plant image input by the user, so that these pictures used for explanation are more similar to the plant images taken by the user. Therefore, it will not occur to the user that the pictures in the output diagnostic information are too different from the plant images taken by himself/herself. In this way, it is possible to avoid causing trouble to the user and improve the user experience.

In some embodiments, the step of extracting diagnostic information from the content management system based on the determined identification information, and outputting the diagnostic information may include:

- determining the corresponding candidate reference image library based on the disease information in the content management system;
- in the candidate reference image library, determining one or more reference images being extracted and a priority corresponding to each of the one or more reference images based on the similarity with the plant image and/or the consistency with the species information; and
- outputting one or more reference images so that the one or more reference images are arranged according to priority in a descending order.

Each reference image in the content management system may be marked with UID1 of corresponding species information (UID1 can include species, variants, varieties, genus, family, etc.) and UID2 of disease information. Based on UID1 and UID2, reference images may be classified, filtered, etc. For example, according to UID2, one or more reference images corresponding to each disease information may be combined into a candidate reference image library respectively corresponding to the corresponding disease information. When selecting the required reference image from the reference image library, the type of plant corresponding to the reference image may be determined based on the UID1 marked on each reference image. By displaying a reference image, the user is able to better identify the disease of the plant, especially when the image of the plant taken by the user is unclear or the part being captured is not good.

Under normal circumstances, the reference image with higher similarity with the plant image and higher consistency with the species information will have a higher priority. Reference images with higher priority may be displayed first or arranged in front of multiple displayed reference images for the users to see easily.

In some embodiments, in the candidate reference image library, the step of determining one or more reference images being extracted and a priority corresponding to each of the one or more reference image based on the similarity with the plant image and/or the consistency with the species information may include:

using the preset number of candidate reference images in the candidate reference image library that have the highest similarity with the plant image as the first reference image set, and using all other candidate reference images in the candidate reference image library as the second reference image set;

in the first reference image set, determining a first reference image that matches the species information at a first species classification level, wherein the determined first reference image has a first priority;

in the second reference image set, determining a second reference image matching the species information at the first species classification level, wherein the determined second reference image has a second priority, and the second priority is lower than the first priority;

in the first reference image set, determining a third reference image matching the species information at a second species classification level higher than the first species classification level, wherein the determined third reference image has a third priority, and the third priority is lower than the second priority; and in the second reference image set, determining a fourth reference image matching the species information at a second species classification level, wherein the determined fourth reference image has a fourth priority, and the fourth priority is lower than the third priority.

In a specific example, six candidate reference images that are the most similar to the image features of the plant image uploaded by the user may be determined from the candidate reference image library as the first image set, and the other candidate reference images in the candidate reference image library may be used as the second image set. First, in the first image set, the first reference image that matches the species of the plant in the plant image is searched, and this first reference image has the highest first priority; then, in the second image set, the second reference image that matches the species of the plant in the plant image is searched, and the second reference image has a second priority lower than the first priority. Then, in the first image set, a third reference image that matches the genus of the plant in the plant image is searched, and the third reference image has a third priority lower than the second priority. Then, in the second image set, a fourth reference image matching the genus of the plant in the plant image is searched, and the fourth reference image has a fourth priority lower than the third priority. Next, in the first image set, a fifth reference image matching the family of the plant in the plant image is searched, and the fifth reference image has a fifth priority lower than the fourth priority. Finally, in the second image set, a sixth reference image that matches the family of the plant in the plant image is searched, and the sixth reference image has the lowest sixth priority. When displaying the reference images, they may be displayed in the order of the first reference image, the second reference image, the third reference image, the fourth reference image, the fifth reference image, and the sixth reference image, wherein the first reference image is displayed in the most eye-catching position.

In some embodiments, in the candidate reference image library, the step of determining one or more reference images to be extracted and the priority corresponding to each of the one or more reference images based on the similarity with the plant images and/or the consistency with the species information may further include:

when a reference image matching the species information at a species classification level lower than or equal to the preset species classification level cannot be determined in the first reference image set and the second reference image set, determining the preset default image corresponding to the disease information as the reference image.

For example, if the user still cannot find a matching resultant reference image in the first or second image set after searching for the classification level of family, the user may use the preset default image in the reference image library as the reference image and no further search will be performed.

Normally, the display scale of the images in the displayed diagnostic information is between 3:2 and 1:1, thus providing a better display effect. However, the scale of the reference images filtered from the candidate reference image library might not fit the above display scale. Typically, such images may be stretched or cropped to fit the display scale. However, considering that stretching the reference image might cause the features of some diseases to be deformed and make it difficult for the user to identify the disease, in the exemplary embodiment of the present disclosure, cropping may be used instead to process the reference image. Specifically, the method for diagnosing plant diseases may also include: cropping the edge region of the original image forming the reference image, so that the scale of the reference image obtained after cropping is consistent with the preset display scale, and the image features corresponding to the disease information in the reference image are located in the middle area of the reference image.

Specifically, based on the area identification model, when selecting materials of reference images for the content management system, images whose image features corresponding to the disease information are located in the edge regions are removed or ignored. These images are not included in the content management system. Alternatively, the image may be processed, for example, by cropping while the image is stored in the content management system. Alternatively, after determining the reference image to be output based on the plant image, the reference image of the selected content management system may be processed, for example, by cropping, followed by outputting. Of course, in some other embodiments, the locations of the features of the disease in the original image forming the reference image may also be determined in advance, so it is possible to avoid these locations during the cropping process.

Figure 7:
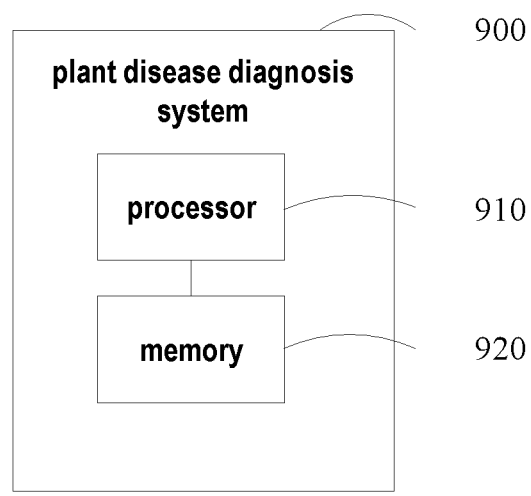
FIG. 7 shows a block diagram of a plant disease diagnosis system according to an exemplary embodiment of the present disclosure.

In another aspect of the present disclosure, a plant disease diagnosis system is also provided. As shown in FIG. 7, the plant disease diagnosis system 900 may include a processor 910 and a memory 920. Instructions are stored in the memory 920. When the instructions are executed by the processor 910, steps of the method for diagnosing plant disease described above may be implemented.

In the plant disease diagnosis system, the processor 910 may perform various actions and processes according to instructions stored in the memory 920. Specifically, the processor 910 may be an integrated circuit chip with signal processing capabilities. The above-mentioned processor may be a general-purpose processor, a digital signal processor (DSP), an application-specific integrated circuit (ASIC), an off-the-shelf programmable gate array (FPGA) or other programmable logic devices, discrete gate or transistor logic devices, or discrete hardware components. Various methods, steps, and logical block diagrams disclosed in the embodiments of the present disclosure may be implemented or executed. The general-purpose processor may be a microprocessor or the processor may be any conventional processor, etc., and may have an X86 architecture or an ARM architecture, etc.

The memory 920 stores executable instructions, which are used by the processor 910 to execute the above-described method for diagnosing plant diseases. Memory 920 may be a volatile memory or a non-volatile memory, or may include both volatile and non-volatile memories. Non-volatile memory may be a read-only memory (ROM), a programmable read-only memory (PROM), an erasable programmable read-only memory (EPROM), an electrically erasable programmable read-only memory (EEPROM), or a flash memory. Volatile memory may be random access memory (RAM), which acts as an external cache. By way of illustration, but not limitation, many forms of RAM are available, such as static random access memory (SRAM), dynamic random access memory (DRAM), synchronous dynamic random access memory (SDRAM), double data rate synchronous dynamic random access memory (DDRS-DRAM), enhanced synchronous dynamic random access memory (ESDRAM), synchronous linked dynamic random access memory (SLDRAM) and direct memory bus random access memory (DR RAM). It should be noted that memory for the methods described herein is intended to include, but is not limited to, these and any other suitable types of memory.

In some embodiments, the plant disease diagnosis system may also include a content management system. Descriptive content about plants and their diseases may be stored in the content management system in the embodiment of the present disclosure. These descriptive contents may include text or pictures, and may include various fields, articles, etc., for example. Accordingly, it is possible for users to obtain introductions about plants and their diseases, such as interesting stories, uses of plants, maintenance methods and descriptions of diseases, etc., from the diagnostic information extracted and output from the content management system. Of course, in some other embodiments, the content management system may also be independent of the plant disease diagnosis system, and the plant disease diagnosis system may be communicatively connected with the content management system to obtain relevant content.

In another aspect of the present disclosure, a computer-readable storage medium is provided. Instructions are stored in the computer-readable storage medium. When the instructions are executed, steps of the above-described method for diagnosing plant diseases may be implemented.

Similarly, computer-readable storage media in embodiments of the present disclosure may be volatile memory or non-volatile memory, or may include both volatile and non-volatile memories. It should be noted that computer-readable storage media described herein are intended to include, without limitation, these and any other suitable types of memory.

The present disclosure also provides a computer program product, which may include instructions. When the instructions are executed by a processor, steps of the method for diagnosing plant diseases as described above may be implemented.

The instructions may be any set of instructions to be executed directly by one or more processors, such as machine code, or any set of instructions to be executed indirectly, such as a script. The terms "instructions," "applications," "processes," "steps," and "procedures" are used interchangeably herein. Instructions may be stored in object code format for direct processing by one or more processors, or in any other computer language, including a script or set of independent source code modules that are interpreted on demand or compiled ahead of time. Instructions may include instructions that make, for example, one or more processors to act as various neural networks herein. The functionality, methods, and routines of instructions are explained in more detail elsewhere in this disclosure.

It should be noted that the flowcharts and block diagrams in the accompanying drawings illustrate the possible implementation architecture, functions and operations of systems, methods and computer program products according to various embodiments of the present disclosure. In this regard, each block in the flowchart or block diagrams may represent a module, segment, or portion of code that contains one or more executable instructions for implementing the specified logic function. It should also be noted that, in some alternative implementations, the functions noted in the block may occur in an order different from that shown in the figures. For example, two blocks shown one after another may actually execute substantially in parallel, or they may sometimes be executed in the reverse order, depending on the functionality involved. It should also be noted that each block of the block diagram and/or flowchart illustration, and combinations of blocks in the block diagram and/or flowchart illustration may be implemented by special-purpose hardware-based systems that perform the specified functions or operations, or may be implemented by using a combination of special-purpose hardware and computer instructions.

Generally speaking, the various example embodiments of the present disclosure may be implemented in hardware or special purpose circuits, software, firmware, logic, or any combination thereof. In some other aspects, the various example embodiments of the present disclosure may be implemented in hardware, while other aspects may be implemented in firmware or software that may be executed by a controller, microprocessor, or other computing device. While aspects of embodiments of the present disclosure are illustrated or described as block diagrams, flowcharts, or using some other graphical representation, it will be understood that the blocks, devices, systems, techniques, or methods described herein may be used as non-limiting examples which are implemented in hardware, software, firmware, special purpose circuitry or logic, general purpose hardware or controllers, or other computing devices, or some combination thereof.

In the description and claims, the words "front", "back", "top", "bottom", "above", "below", etc. are used for descriptive purposes and do not necessarily mean to describe a constant relative position. It is to be understood that the words thus used are interchangeable under appropriate circumstances such that the embodiments of the disclosure described herein, for example, may be operated in other orientations than those illustrated or otherwise described herein.

As used herein, the word "exemplary" means "serving as an example, instance, or illustration" rather than as a "model" that will be accurately reproduced. Any implementation illustratively described herein is not necessarily to be construed as preferred or advantageous over other implementations. Furthermore, the disclosure is not bound by any expressed or implied theory presented in the above technical field, background, brief summary or detailed description.

As used herein, the word "substantially" is meant to include any minor variations resulting from design or manufacturing defects, device or component tolerances, environmental effects, and/or other factors. The word "substantially" also allows for differences from perfect or ideal conditions due to parasitic effects, noise, and other practical considerations that may be present in actual implementations.

Additionally, the foregoing description may refer to elements or nodes or features being "connected" or "coupled" together. As used herein, unless expressly stated otherwise, "connected" means that one element/node/feature is electrically, mechanically, logically, or otherwise directly connected to another element/node/feature (or direct communication). Similarly, unless expressly stated otherwise, "coupled" means that one element/node/feature can be directly or indirectly connected mechanically, electrically, logically, or otherwise to another element/node/feature to allow interactions even though the two features may not be directly connected. That is, "coupled" is intended to encompass both direct and indirect connections of elements or other features, including connections via one or more intervening elements.

Additionally, "first," "second," and similar terms may also be used herein for reference purposes only and are therefore not intended to be limiting. The words "first," "second," and other such numerical terms referring to structures or elements do not imply a sequence or order unless clearly indicated by the context.

It will also be understood that the word "comprising/containing" when used herein illustrates the presence of the indicated features, integers, steps, operations, units and/or components, but does not exclude the presence or addition of one or more other features, integers, steps, operations, units and/or components and/or combinations thereof.

In this disclosure, the term "provide" is used in a broad sense to involve any ways of obtaining an object, so "providing an object" includes but is not limited to "purchasing", "preparing/manufacturing", "arranging/setting up", "installing/assembly", and/or "order" objects, etc.

Although some specific embodiments of the present disclosure have been described in detail through examples, those skilled in the art will understand that the above examples are for illustration only and are not intended to limit the scope of the disclosure. The various embodiments disclosed herein may be combined in any manner without departing from the spirit and scope of the disclosure. Those skilled in the art will further appreciate that various modifications may be made to the embodiments without departing from the scope and spirit of the disclosure. The scope of the disclosure is defined by the appended claims.

What is claimed is:

1. A method for diagnosing plant diseases, comprising:
acquiring plant images;
determining identification information according to the plant images, which are acquired, wherein the identification information comprises at least one of species information and disease information; and
extracting diagnostic information from a content management system according to the identification information, which are determined, and outputting the diagnostic information, the diagnostic information comprises a descriptive content of plants and their diseases, with regard to different plant images, if the identification information, which are determined, is all the same, at least part of the diagnostic information changes along with the different plant images, the at least part of the diagnostic information comprises reference images, the reference images at least correspond to the disease information, and the reference images are similar to the plant images;
wherein the step of extracting the diagnostic information from the content management system according to the identification information, which are determined, and outputting the diagnostic information comprises:
in the content management system, determining a candidate reference image library, which is corresponded, according to the disease information;
in the candidate reference image library, determining one or more the reference images to be extracted and a priority corresponding to each of the one or more the reference images based on a similarity with the plant images and/or a consistency with the species information; and
outputting one or more the reference images, so that one or more the reference images are arranged according to the priority in a descending order.

2. The method for diagnosing the plant diseases according to claim 1, wherein in the candidate reference image library, the step of determining one or more the reference images to be extracted and the priority corresponding to each of one or more the reference images based on the similarity with the plant images and/or the consistency with the species information comprises:
using a preset number of candidate reference images in the candidate reference image library that have a highest similarity with the plant images as a first reference image set, and using all other candidate reference images in the candidate reference image library as a second reference image set;
in the first reference image set, determining a first reference image matching the species information at a first species classification level, wherein the first reference image, which is determined, has a first priority;
in the second reference image set, determining a second reference image matching the species information at the first species classification level, wherein the second reference image, which is determined, has a second priority, and the second priority is lower than the first priority;
in the first reference image set, determining a third reference image matching the species information at a second species classification level higher than the first species classification level, wherein the third reference image, which is determined, has a third priority, and the third priority is lower than the second priority; and
in the second reference image set, determining a fourth reference image that matches the species information at the second species classification level, wherein the fourth reference image, which is determined, has a fourth priority, and the fourth priority is lower than the third priority.

3. The method for diagnosing the plant diseases according to claim 2, wherein in the candidate reference image library, the step of determining one or more the reference images to be extracted and the priority corresponding to each of the one or more the reference images based on the similarity with the plant images and/or the consistency with the species information further comprises:

when a reference image matching the species information at a species classification level lower than or equal to a preset species classification level cannot be determined in the first reference image set and the second reference image set, determining a preset default image corresponding to the disease information as a reference image.

4. The method for diagnosing the plant diseases according to claim 1, wherein the method further comprises:

cropping an edge region of an original image forming the reference image, so that a scale of the reference image obtained after cropping conforms to a preset display scale, and an image feature corresponding to the disease information in the reference image is in a middle region of the reference image.

5. The method for diagnosing the plant diseases according to claim 1, wherein the step of extracting the diagnostic information from the content management system according to the identification information, which are determined, and outputting the diagnostic information comprises:

in the content management system, extracting corresponding diagnostic data according to a preset output field based on the identification information, which are determined;

when complete diagnostic data is extracted, generating the diagnostic information based on the diagnostic data and outputting the diagnostic information.

6. The method for diagnosing the plant diseases according to claim 5, wherein the step of extracting the diagnostic information from the content management system according to the identification information, which are determined, and outputting the diagnostic information further comprises:

when the complete diagnostic data is not extracted, in the content management system, searching for diagnostic literature, which is corresponded, based on the identification information, which are determined; and generating the diagnostic information based on the diagnostic literature, and outputting the diagnostic information.

7. The method for diagnosing the plant diseases according to claim 4, wherein the step of extracting the diagnostic information from the content management system according to the determined identification information, which are determined, and outputting the diagnostic information further comprises:

in the content management system, generating the diagnostic information according to a preset output format, and outputting the diagnostic information.

8. The method for diagnosing the plant diseases according to claim 5, wherein the diagnostic data comprises diagnostic summary data, and the diagnostic summary data comprise at least one of disease names corresponding to a disease name field in the preset output field and a diagnostic summary corresponding to a diagnostic summary field in the preset output field.

9. The method for diagnosing the plant diseases according to claim 5, wherein the diagnostic data comprises diagnostic detailed data, which comprise at least one of a disease analysis corresponding to a disease analysis field in the preset output field, a solution corresponding to a solution field in the preset output field, and a precautionary measure corresponding to a precautionary measure field in the preset output field.

10. The method for diagnosing the plant diseases according to claim 1, wherein the step of determining the identification information based on the acquired plant image comprises:

when a current diagnostic mode is a passive diagnostic mode, determining a candidate species and a candidate disease corresponding to at least part of the candidate species based on the plant images;

for the candidate species with the candidate disease, which is corresponded, removing the candidate disease of the candidate species according to a first preset condition; and after performing removal, if there is a disease remaining, remaining disease is used as the disease information, and the candidate species corresponding to the remaining disease is used as the species information.

11. The method for diagnosing the plant diseases according to claim 10, wherein the step of determining the candidate species and the candidate disease corresponding to at least part of the candidate species based on the plant images comprises:

determining whether the candidate species is on a preset species whitelist;

when the candidate species is on the preset species whitelist, determining the candidate disease corresponding to the candidate species based on the plant images and the candidate species;

when the candidate species is not on the preset species whitelist, not determining the candidate disease corresponding to the candidate species for the candidate species.

12. The method for diagnosing the plant diseases according to claim 10, wherein the step of removing the candidate disease of the candidate species according to the first preset condition comprises:

when there are at least two candidate diseases corresponding to the same candidate species, removing the candidate disease of the candidate species according to the first preset condition based on a diagnostic confidence level of the candidate disease in a descending order until the remaining disease is filtered or all of the candidate diseases corresponding to the candidate species are removed.

13. The method for diagnosing the plant diseases according to claim 10, wherein the step of removing the candidate disease of the candidate species according to the first preset condition comprises:

determining whether the candidate species is on a preset species whitelist;

when the candidate species is not on the preset species whitelist, removing the candidate disease corresponding to the candidate species.

14. The method for diagnosing the plant diseases according to claim 10, wherein the step of removing the candidate disease of the candidate species according to the first preset condition comprises:

comparing a diagnostic confidence level of the candidate disease with a first preset confidence level;

when the diagnostic confidence level of the candidate disease is less than the first preset confidence level, removing the candidate disease.

15. The method for diagnosing the plant diseases according to claim 10, wherein the step of removing the candidate disease of the candidate species according to the first preset condition comprises:

comparing a diagnostic accuracy of the candidate disease with a preset accuracy;

when the diagnostic accuracy of the candidate disease is less than the preset accuracy, removing the candidate disease.

16. The method for diagnosing the plant diseases according to claim 10, wherein the step of removing the candidate disease of the candidate species according to the first preset condition comprises:
determining whether the candidate species is on a first candidate species blacklist corresponding to the candidate disease;
when the candidate species is on the first candidate species blacklist, removing the candidate disease.

17. The method for diagnosing the plant diseases according to claim 1, wherein the step of determining the identification information based on the plant images, which are acquired, further comprises:
when a current diagnostic mode is an active diagnostic mode, determining a candidate species and candidate disease information corresponding to the candidate species based on the plant image, wherein the candidate disease information comprises the candidate disease or the candidate disease is not detected;
filtering the disease information from the candidate disease information according to a second preset condition.

18. The method for diagnosing the plant diseases according to claim 17, wherein the step of filtering the disease information from the candidate disease information according to the second preset condition comprises:
comparing a species confidence level of the candidate species with a second preset confidence level, and comparing a diagnostic confidence level of the candidate disease information corresponding to the candidate species with a third preset confidence level;
when the species confidence level of the candidate species is greater than or equal to the second preset confidence level, and the diagnostic confidence level of the candidate disease information is greater than or equal to the third preset confidence level, filtering the candidate species as a first pending species, and filtering the candidate disease information as first pending disease information.

19. The method for diagnosing the plant diseases according to claim 18, wherein the step of filtering the disease information from the candidate disease information according to the second preset condition further comprises:
determining whether the first pending species is on a second candidate species blacklist corresponding to the first pending disease information;
when the first pending species is on the second candidate species blacklist, removing the first pending disease information.

20. The method for diagnosing the plant diseases according to claim 19, wherein a number of the plant images is at least two, and the candidate species and the candidate disease information corresponding to the candidate species are determined based on each of the plant images;
the step of filtering the disease information from the candidate disease information according to the second preset condition further comprises:
for each of the plant images, filtering the first pending disease information corresponding to the plant image and having a maximum diagnostic confidence level as second pending disease information of the plant images;
filtering the disease information from the second pending disease information of all of the plant images according to a third preset condition.

21. The method for diagnosing the plant diseases according to claim 1, wherein the step of determining the identification information based on the plant images, which are acquired, further comprises:
when a current diagnostic mode is an active diagnostic mode, respectively determining candidate species corresponding to each plant image based on a plurality of the plant images;
respectively for the plant images, filtering a candidate species with a maximum species confidence level as a second pending species corresponding to the plant images;
among the second pending species respectively corresponding to the plant images, filtering a second pending species in a maximum number as the species information, or filtering the second pending species in the maximum number and having the maximum species confidence level as the species information;
determining the disease information corresponding to the species information.

22. The method for diagnosing the plant diseases according to claim 1, wherein the step of determining the identification information according to the plant images, which are acquired, comprises:
using species identification model, which is pre-trained, to determine the species information according to the plant images;
wherein the species identification model is a neural network model.

23. The method for diagnosing the plant diseases according to claim 1, wherein the step of determining the identification information according to the plant images, which are acquired, comprises:
using a species identification model, which is pre-trained, to determine the species information according to the plant images;
wherein the species identification model is a neural network model.

24. A plant disease diagnosis system, comprising a processor and a memory, wherein instructions are stored in the memory, when the instructions are executed by the processor, the steps of the method for diagnosing the plant diseases according to are claim 1 is implemented.

25. A computer program product, comprising instructions, wherein when the instructions are executed by a processor, the steps of the method for diagnosing the plant diseases according to claim 1 is implemented.

* * * * *